United States Patent

[11] 3,613,095

| [72] | Inventor | Albert A. Elwood<br>P.O. Box 10592—Riviera Beach, Fla. |
|---|---|---|
| [21] | Appl. No. | 833,638 |
| [22] | Filed | June 16, 1969 |
| [45] | Patented | Oct. 12, 1971 |

[54] METHOD OF AND APPARATUS FOR LOCATING A POSITION
12 Claims, 4 Drawing Figs.

| [52] | U.S. Cl. | 343/112 D |
|---|---|---|
| [51] | Int. Cl. | G01s 5/14 |
| [50] | Field of Search | 343/112.3, 6.5 LC |

[56] References Cited
UNITED STATES PATENTS

| 3,150,372 | 9/1964 | Groth, Jr. | 343/112.3 |
| 3,237,196 | 2/1966 | Hampton | 343/112.3 |
| 3,339,202 | 8/1967 | Earp | 343/112.3 X |
| 3,341,845 | 9/1967 | Deman | 343/6.5 LC |
| 3,397,400 | 8/1968 | Maass et al. | 343/112.3 |

Primary Examiner—Malcolm F. Hubler
Attorney—Baldwin, Wight & Brown

ABSTRACT: A method of an apparatus for locating a position in which a plurality of frequency standard devices based on the action of the natural frequencies associated with transitions between energy states in atoms and/or molecules are synchronized or phase compared at the same initial location, two of the devices are placed at transmitting stations on a known base line, with the third device at a third station which receives the signals from the two transmitting stations and compares the received frequencies with its own device, then converts said phase differential into distance so as to determine the exact location of the third station.

INVENTOR.
ALBERT A. ELWOOD
BY
Baldwin Wight Weller & Brown, Attorneys

INVENTOR.
ALBERT A. ELWOOD

3,613,095

METHOD OF AND APPARATUS FOR LOCATING A POSITION

BACKGROUND OF THE INVENTION

1. Field of the Invention

This invention relates in general to position locating and in more particularity to a method and apparatus for accurately locating a specific position.

Although both the method and the apparatus are of general utility they are especially useful in offshore oil surveys where it is important that a specific location be accurately and precisely identified. In an operation such as an offshore oil survey the two transmitting stations would be land-based whereas the receiving station would be located on an offshore vessel which can be moved to the exact location which is being sought.

2. Description of the Prior Art

Many phase or time comparison systems have been developed for locating a position and are in use today. There are those based on the radar principle in which an echo or return of signal technique is used; there are those based on the loran principle where receipt and retransmission of a signal is utilized.

SUMMARY OF THE INVENTION

Due to the high stability of the atomic clock, which is accurate on the order of one part in $10^{12}$ or $10^{13}$, no continuous synchronization between stations is required once the initial synchronization among three atomic clocks is performed or the initial phase/time relationships among the three atomic clocks established.

The frequency of an atomic clock is determined by atomic particle or molecular vibrations and thereby remains constant. Its accuracy is about 100 to 1,000 times as great as that of the quartz clock in which the vibration frequency changes in the course of time. Due to the constancy of the frequency of an atomic clock a new and novel system of position locating has been discovered.

It is the primary object of the invention to provide a method of and apparatus for position locating in which atomic clocks or the like are utilized to provide constant frequency signals having constant known phase relationships with one another. The received signals are then converted into distance by determining the phase differential of a plurality of signals from atomic clocks.

Another object of the invention is to provide a position locating system in which no continuous synchronization between stations is required once initial synchronization is performed on phase relationships among atomic clocks established.

A still further object of the invention is to provide a position locating method and system in which the signal transmissions are single path and do not require an echo and/or retransmission.

Yet another object of the invention is to provide a position locating system in which atomic clocks or the like are utilized to provide a plurality of signals having known phase relationships with one another and a plurality of pulse signals having known time relationships with one another to develop respectively fine and coarse position information.

Still a further object of the invention is to provide a radio transmitter suitable for use in a highly accurate position locating system.

Yet a further object of the invention is to provide a radio receiver suitable for use in a position locating system.

Still another object of the invention is to provide a receiving station suitable for use in a position locating system.

Further features, objects, and advantages will either be specifically pointed out or become apparent when, for a better understanding of the invention, reference is made to the following written description taken in conjunction with the accompanying drawings.

DESCRIPTION OF PREFERRED EMBODIMENTS

Figure 1:
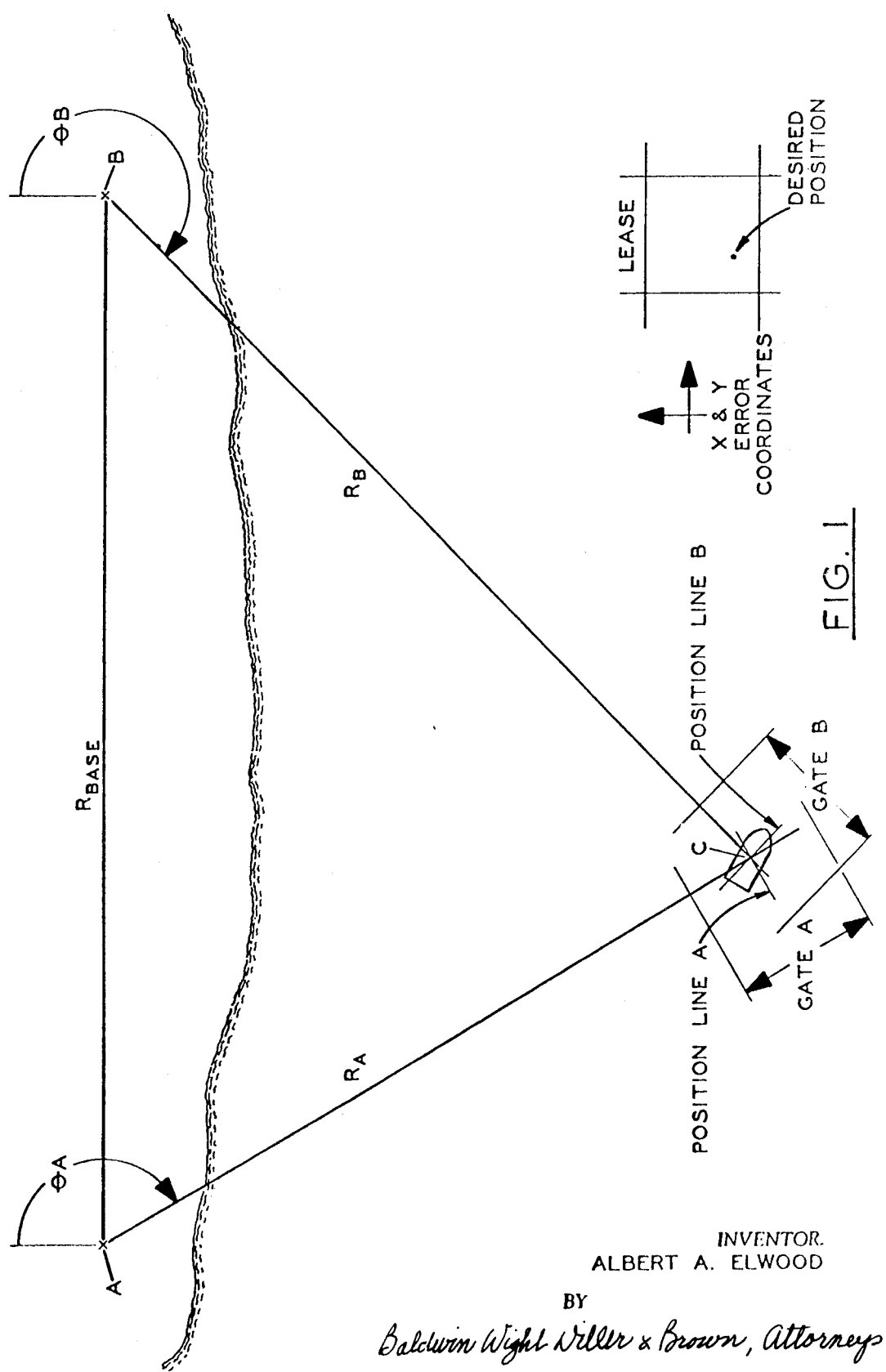
FIG. 1 is a diagrammatic view illustrating the use of a method and system according to my invention.

Referring now to FIG. 1 of the drawings, a system according to the invention will include a transmitting station A, which is placed at a known position, a transmitting station B which is placed at a known position, with A and B placed on a known base line $R_{base}$, and a receiving station C which is at an unknown position and becomes the measured or located position.

Figure 2:
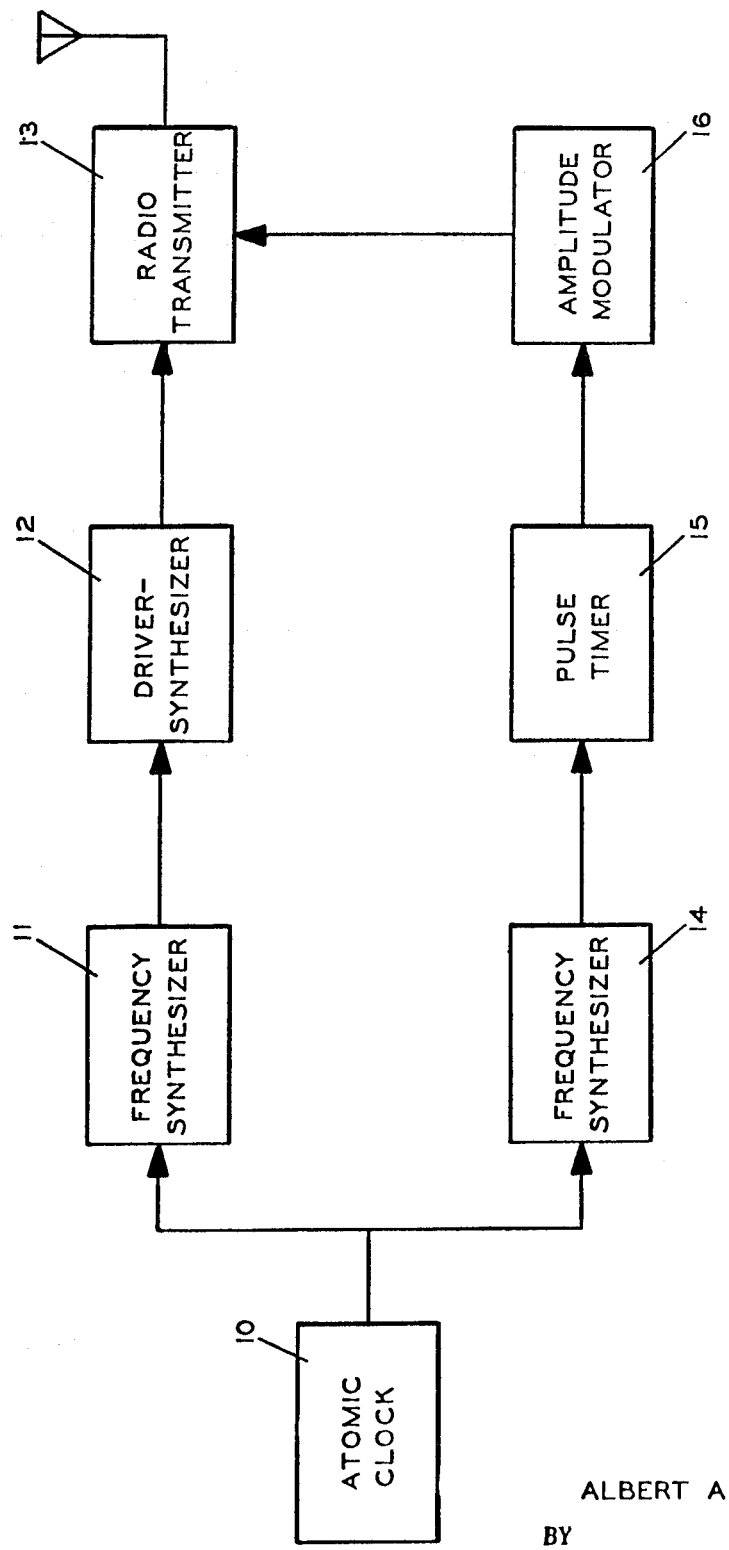
FIG. 2 is a block diagram of an illustrative embodiment of one of the transmitting stations of the system.

The two stations illustrated here as shore-based stations A and B are illustrated in greater detail in FIG. 2. The station shown is duplicated at A and B with the only essential difference being that different RF frequencies are transmitted from respective stations.

Atomic clock 10 provides a high frequency signal, for example 9 gHz, which is utilized in tow ways. The high frequency signal is fed to frequency synthesizer 11 where it is reduced in frequency to a selected frequency in a range suitable for transmission over a distance of up to about 100 miles, in an exemplary system, and for accuracy of phase determination. The range may be, for example, from about 1.0 to about 5.0 mHz. The frequency synthesizer 11 converts the high frequency signal, from clock 10 to one in the lower range (1.0–5.0 mHz.) while maintaining the stability of the primary standard from clock 10. The output of frequency synthesizer 11 which is extremely accurate in its phase and frequency characteristics is fed to driver synthesizer 12 wherein it is amplified to a level sufficient to drive highly stable radio transmitter 13. The radio transmitter 13 is provided with an antenna from which a radio frequency signal of a given frequency within the selected range and of precise phase and frequency is transmitted. Thus, the stability and accuracy of clock 10 is preserved and reflected in the radiated signal.

The high frequency signal from clock 10 is also fed to frequency synthesizer 14 wherein it is converted to a given signal in the above-mentioned suitable lower range, for example, from about 1.0 mHz. to about 5.0 mHz. Frequency synthesizer 14, like synthesizer 11, preserves the accuracy and stability of clock 10 and reflects the accuracy thereof in its own output which is coupled, as a synchronizing signal, to time format generator or pulse timer 15. Pulse timer 15 produces a train of pulses which are very accurately positioned with respect to one another. The pulses may be positioned, for example, at 10-second intervals.

The pulses from pulse timer 15 are fed to amplitude modulator 16 which, in turn, is arranged to modulate transmitter 13.

The pulse modulations from transmitting stations A and B (FIG. 1) are utilized at a moving receiving station C (FIG. 1) to produce coarse position information data, and the phase relationships of the radio frequency signals from the transmitting stations are utilized to produce fine position information.

Figure 3:
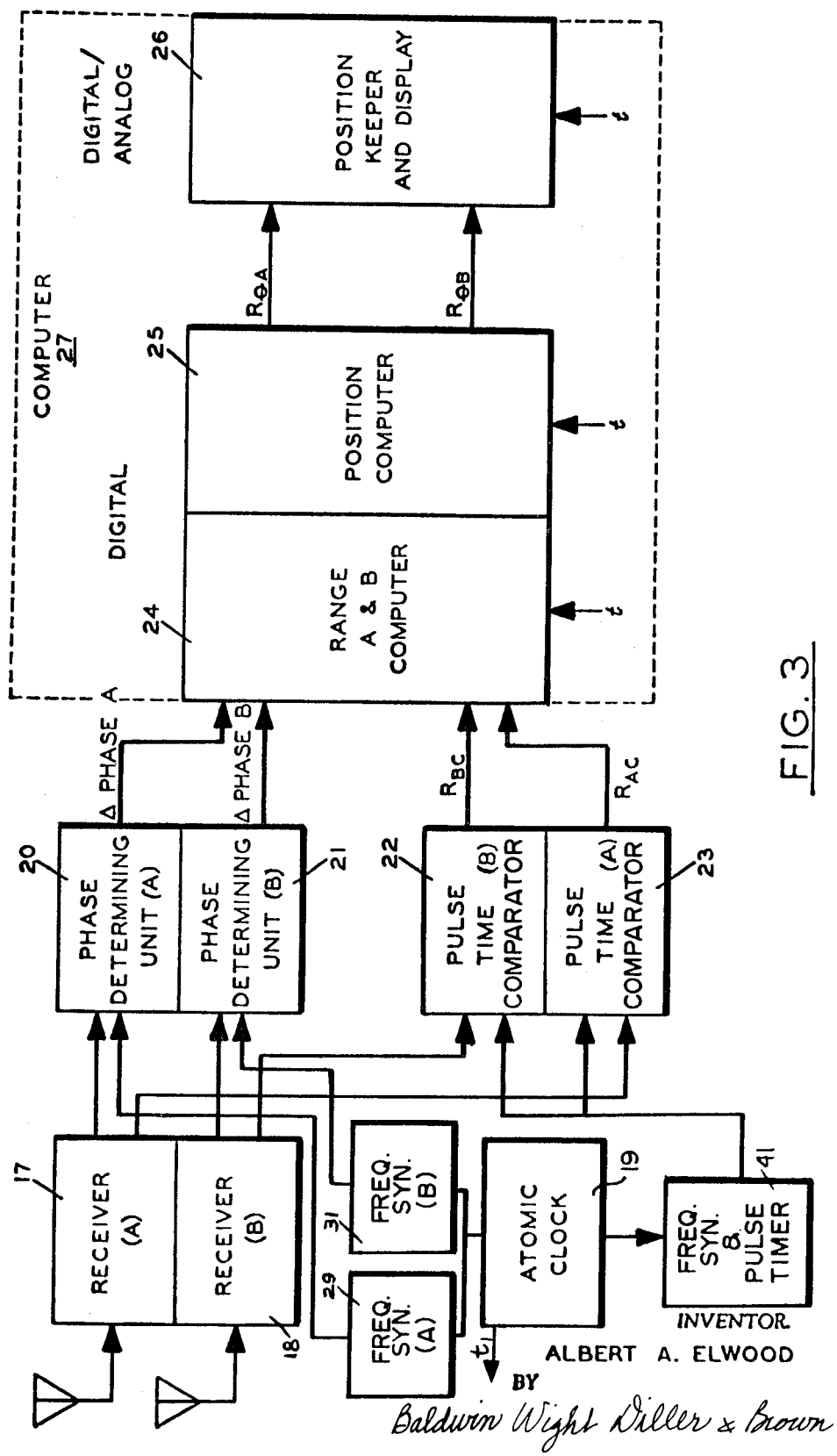
FIG. 3 is a block diagram of an illustrative embodiment of one of the receiving stations of the system.

The signal from radio transmitter 13 at station A (FIG. 1) is received by the receiver 17 (FIG. 3) while the signal from radio transmitter 13 at station B (FIG. 1) is received by the receiver 18 (FIG. 3). Radio frequency output signals from receivers 17 and 18 are fed to phase determining units 20 and 21, respectively, each of which compares the phase of respective radio frequency signals with the phase of the radio frequency signals from frequency synthesizers 29 and 31 which have their respective inputs coupled to atomic clock 19. The phase differences translated into digital signals, Δ phase A and Δ phase B, representative of phase difference are fed into the range computer 24 of the computer section 27 of the system and converted into two range signals indicating fine position information within a particular lane which may, for example, be 720 feet wide. Each degree of relative phase rotation in the example represents 2 feet. Of course, the output of phase determining units 20 and 21 do not provide lane identification.

Each of the receivers 17 and 18 is provided with amplitude demodulators, not shown, which develop pulse signals which are fed to pulse time comparators 23 and 22, respectively. Each of pulse timers 22 and 23 compares the time occurrence of each of the pulse signals with the time of occurrence of pulses in a train of pulses fed to each pulse time comparator 22 and 23 from frequency synthesizer and pulse timer 41 which has its input coupled to the atomic clock 19. The pulse time comparators provide output coarse range digital signals $R_{BC}$ and $R_{AC}$ which are also fed into range computer 24, the output of which is coupled to computer 25 which provides output signals $R_{\theta A}$ and $R_{\theta B}$ representing the accurate distance station C is from each of the stations A and B.

The position computer 25 operates the position keeper and display 26 which converts the two ranges from shore stations A and B into precision position in any selected coordinate system. Signals $R_{\theta A}$ and $R_{\theta B}$ may be either digital or analog signals and the position keeper and display may be either digital or analog or both. The atomic clock 10 is provided with a timing output signal $t_1$ which is used to synchronize computer 27 as illustrated generally by timing inputs $t$ which are provided by countdown circuits, not shown, which are driven by timing signal $t_1$. Alternatively, timing signal $t_1$ could be directly fed into the computer 27 provided that computer 27 contained suitable count-down circuits.

Figure 4:
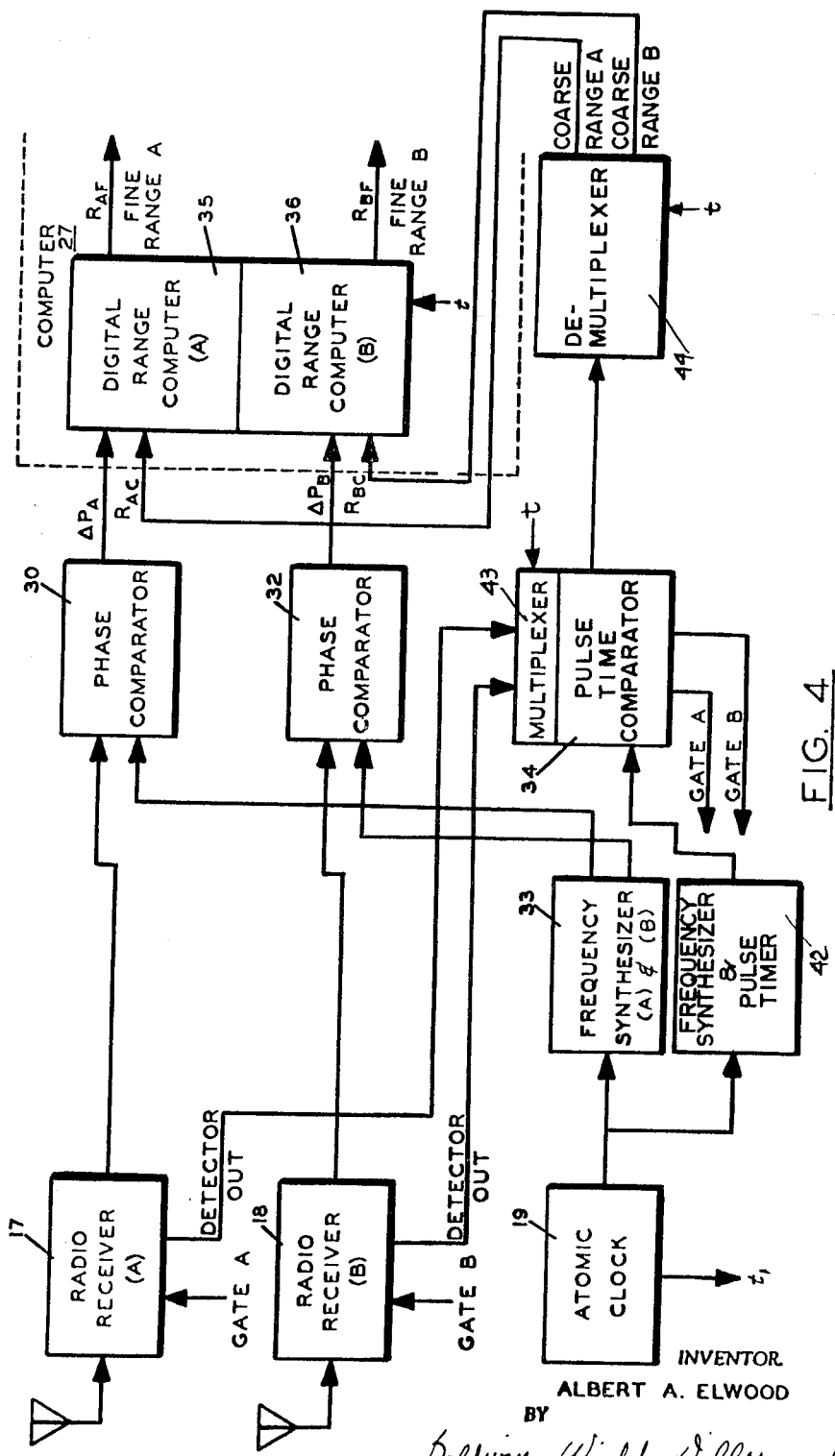
FIG. 4 is a block diagram in greater detail of part of a typical receiving station; the two sheets of the drawing containing FIG. 4 are to be placed end to end to illustrate a complete system.
Figure 4:
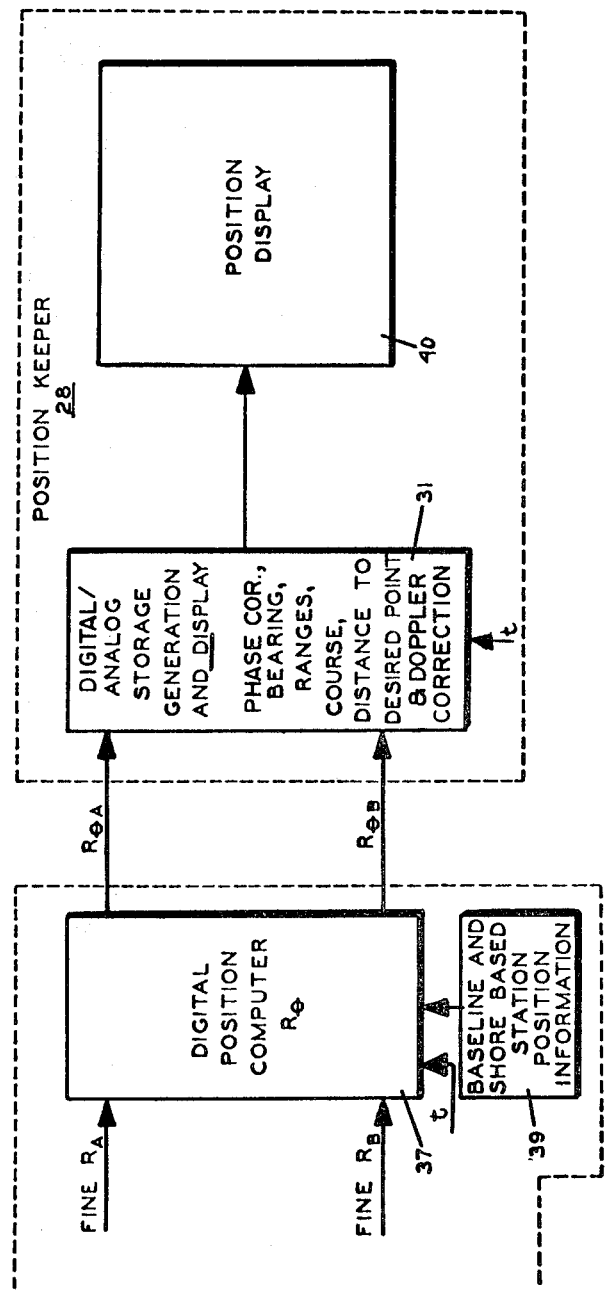

FIG. 4 illustrates in greater detail the instrumentation used in the offshore station when the system is being used to locate an offshore position.

Phase determining unit 20 of FIG. 3 is shown, in FIG. 4, as comprised of a phase comparator 30. Phase determining unit 21 of FIG. 3 is shown in FIG. 4 as comprised of a phase comparator 32.

Frequency synthesizers 33 shown in FIG. 4 correspond to frequency synthesizers 29 and 31 shown in FIG. 3 and frequency synthesizer and pulse timer 42 corresponds to frequency synthesizer and pulse timer 41 shown in FIG. 3.

In the embodiment illustrated in FIG. 4, the function of the two-pulse time comparators 22 and 23 illustrated in FIG. 3 is performed by a single-pulse time comparator 34 which has its pulse inputs from receivers 17 and 18 provided via a multiplexer 43, and its outputs representative of coarse range A and B data fed to computer 27 via demultiplexer 44.

Digital outputs from phase comparators 30 and 32 are fed respectively to digital range computers 35 and 36 as fine position data, while, outputs from pulse time comparator 34 are fed respectively to digital range computers 35 and 36 as coarse position data.

The two digital range computers 35 and 36 process their respective data inputs to provide output signals representing the fine (accurate) range of station C from stations A and B respectively.

The outputs from digital range computers 35 and 36 are fed to digital position computer 37 associated with data storage apparatus 39 which provides base line and shore base station information. Using stored information from apparatus 39, digital position computer 37 translates the fine (accurate) position data supplied from range computers 35 and 36 into position signals $R_{\theta A}$ and $R_{\theta B}$ which are fed to digital/analog storage generation and display device 31, the output of which is fed to position display member 40.

Device 31 is provided with storage means which contains phase correction data reflecting the initial absolute phase differences between three atomic clocks. Additional stored information, as desired, may be provided or developed within member 31 such as bearing, range, course, and known distance to the desired position within an offshore lease, for example, as shown in FIG. 1. In some applications, such as a fast moving station C, Doppler correction data could be developed or stored within device 31. In the embodiment illustrated in FIG. 4 atomic clock 19 provides a timing output signal $t_1$ which is used to develop, in circuitry not illustrated, timing signals generally designated $t$ which synchronize computer 27, position keeper 28 and multiplexers 43 and 44. Pulse time comparator 34 is provided with two gating outputs A and B which are used to gate radio receivers 17 and 18.

The present invention is highly accurate and serves to eliminate lane ambiguity without the need to be operating at all times or counting lanes as, for example, a vessel carrying the receiving station leaves shore and proceeds to sea.

The atomic clocks used in the present invention may be provided by cesium beam tubes such as the tube forming part of a Hewlett-Packard cesium beam frequency standard sold under model number 5061A. The frequency synthesizers used in the present invention may be constructed similarly to a Hewlett-Packard frequency synthesizer sold under model number 5103A. The transmitters and receivers may be of various constructions, and should be extremely stable. The computer used may be, for example, a Control Data Corporation 5100 system.

It will be appreciated that many variations of the present invention are possible, and the foregoing detailed description relates only to illustrative embodiments.

Among the possible variations is the adaptation of the invention for use in a three dimensional system by providing an additional transmitting station, and adding an additional radio receiver at the receiving station.

Instead of providing that each transmitting station transmit signals of different frequencies, the same frequency may be used and the outputs differently polarized or upper and lower side bands used by respective transmitting stations. In some instances, the fine position information signals may be carried as amplitude modulation on transmitted signals rather than be the carriers.

Although the present invention has been illustrated as having a moving receiving station and two fixed transmitting stations, it will be appreciated that the receiving station could be fixed and one of the transmitting stations moving. In some special applications all of the stations could be moving.

While the present invention has been illustrated as one in which the signal outputs from phase comparators and pulse time comparators are digital, the outputs from these units could, if desired, be made analog in which case the analog outputs could be combined in a network, servosystem or the like.

I claim:

1. A position locating system comprising a first source of a signal of given frequency and given phase, a second source of a signal of said given frequency and a predetermined phase relationship with said given phase, a third source of a signal of said given frequency and a predetermined phase relationship with said given phase, means controlled by said first source for transmitting a first radio signal having a first frequency from a first point including first modulating means controlled by said first source for periodically modulating said first radio signal with a first time signal, means controlled by said second source for transmitting a second radio signal of a second frequency from a second point including second modulating means controlled by said second source for periodically modulating said second radio signal with a second time signal, means controlled by said third source for generating a signal having a frequency identical to that of said first radio signal and a signal having a frequency identical to that of said second radio signal at a third point, means controlled by said third source for periodically producing time reference signals, means for receiving said first radio signal and said second radio signal at said third point, first phase comparing means at said third point for comparing the phase of the received first radio signal with that of said signal having a frequency identical to that of said first radio signal, second phase comparing means at said third point for comparing the phase of the received second radio signal with that of said signal having a frequency identical to that of said second radio signal, means at said third point for demodulating said first and said second radio signals to recover said first time signal and said second time signal, and means for comparing respectively said first time signal and said second time signal with said time reference signals.

2. A position locating system according to claim 1 wherein said first source, said second source and said third source are respectively first, second and third atomic clocks.

3. A position locating system according to claim 1 wherein said first modulating means comprises first means to amplitude modulate said first radio signal with pulses, said second modulating means comprises a second means to amplitude modulate said second radio signal with pulses, said means controlled by said third source for periodically producing time reference signals comprises means at said third point for producing reference pulses, said means at said third point for demodulating said first radio signal and said second radio signal including first means for amplitude demodulating said first radio signal to produce first information pulses and second means for amplitude demodulating said second radio signal to produce second information pulses, and said means for comparing comprises pulse comparing means for comparing said first information pulses and said reference pulses to determine the time relationship therebetween and for comparing said second information pulses with said reference pulses to determine the time relationship therebetween.

4. A position locating system according to claim 3 wherein said first source, said second source and said third source are respectively first, second and third atomic clocks.

5. A position locating system as claimed in claim 4 including computer means for receiving output signals from said first phase comparing means, said second phase comparing means and said pulse comparing means for providing output signal data representative of the distance the third point is from the first and the second points.

6. A position locating system as claimed in claim 5 including means controlled by said computer means for storing and displaying said output signal data.

7. A position locating system as claimed in claim 3 including computer means for receiving output signals from said first phase comparing means, said second phase comparing means and said pulse comparing means for providing output signal data representative of the distance the third point is from the first and the second points.

8. A position locating system as claimed in claim 7 including means controlled by said computer means for storing and displaying said output signal data.

9. A position locating method comprising providing a first signal of given frequency and given phase, providing a second signal of said given frequency and a predetermined phase relationship with said given phase, providing a third signal of said given frequency and a predetermined phase relationship with said given phase, periodically modulating a first radio signal having a first frequency related to said first signal with a first time signal also related to said first signal, transmitting the first radio signal from a first point, periodically modulating a second radio signal of a second frequency related to said second signal with a second time signal also related to said second signal, transmitting the second radio signal from a second point, generating a signal having a frequency identical to that of said first radio signal and a signal having a frequency identical to that of said second radio signal related to said third signal at a third point, generating time reference signals related to the third signal at the third point, receiving said first radio signal and said second radio signal at said third point, demodulating said first radio signal and said second radio signal to recover said first time signal and said second time signal, comparing the phase of the received first radio signal with that of said signal having a frequency identical to that of said first radio signal, comparing the phase of the received second radio signal with that of said signal having a frequency identical to that of said second radio signal, and comparing respectively the recovered first time signal and the recovered second time signal with said time reference signals.

10. A position locating method according to claim 9 wherein said first signal, said second signal and said third signal are respectively provided from first, second and third atomic clocks.

11. A position locating method according to claim 9 wherein the step of modulating said first radio signal comprises amplitude modulating said first radio signal with pulses related to said first signal, the steps of modulating the second radio signal comprises amplitude modulating said second radio signal with pulses related to said second signal, the step of generating time reference signals comprises producing reference pulses related to said third signal at said third point, the step of demodulating said first radio signal and said second radio signal comprises amplitude demodulating said first radio signal and said second radio signal to produce first and second information pulses respectively at said third point, and the step of comparing respectively the recovered first time signals and the recovered second time signals with said time reference signals comprises comparing said first information pulses with said reference pulses to determine the time relationship therebetween and comparing said second information pulses with said reference pulses to determine the time relationship therebetween.

12. A position locating method according to claim 11 wherein said first signal, said second signal and said third signal are respectively provided from first, second and third atomic clocks.